Dec. 28, 1943.    C. W. SINCLAIR    2,337,779
WHEEL
Filed June 28, 1941    3 Sheets-Sheet 1

INVENTOR.
CHARLES W. SINCLAIR
BY
ATTORNEYS

Dec. 28, 1943.  C. W. SINCLAIR  2,337,779
WHEEL
Filed June 28, 1941  3 Sheets-Sheet 2
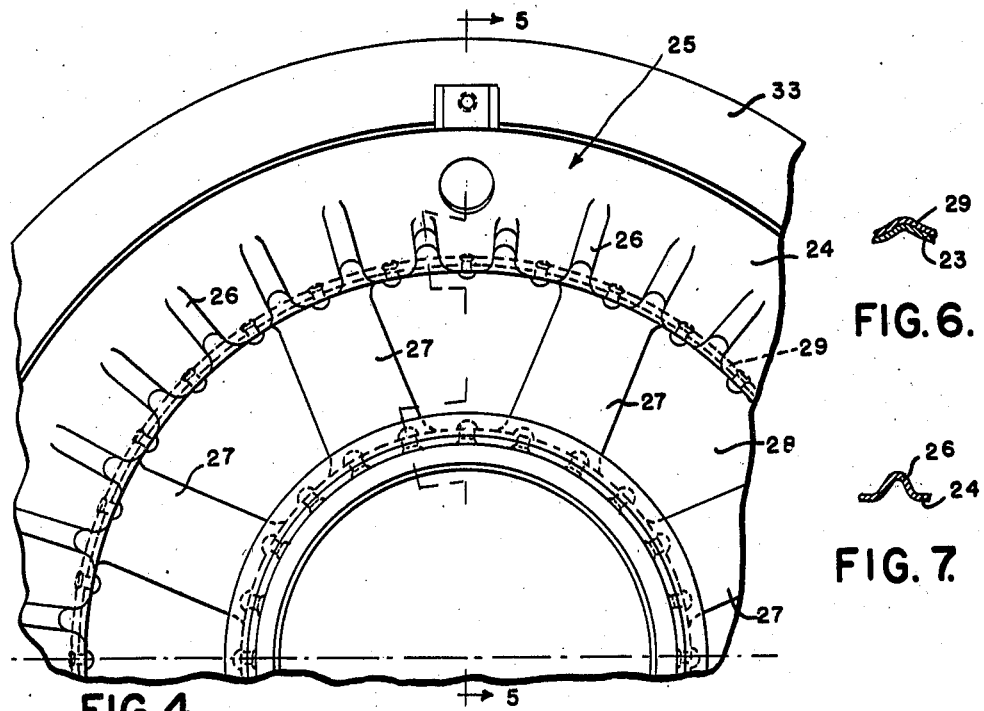
FIG. 4.
FIG. 6.
FIG. 7.
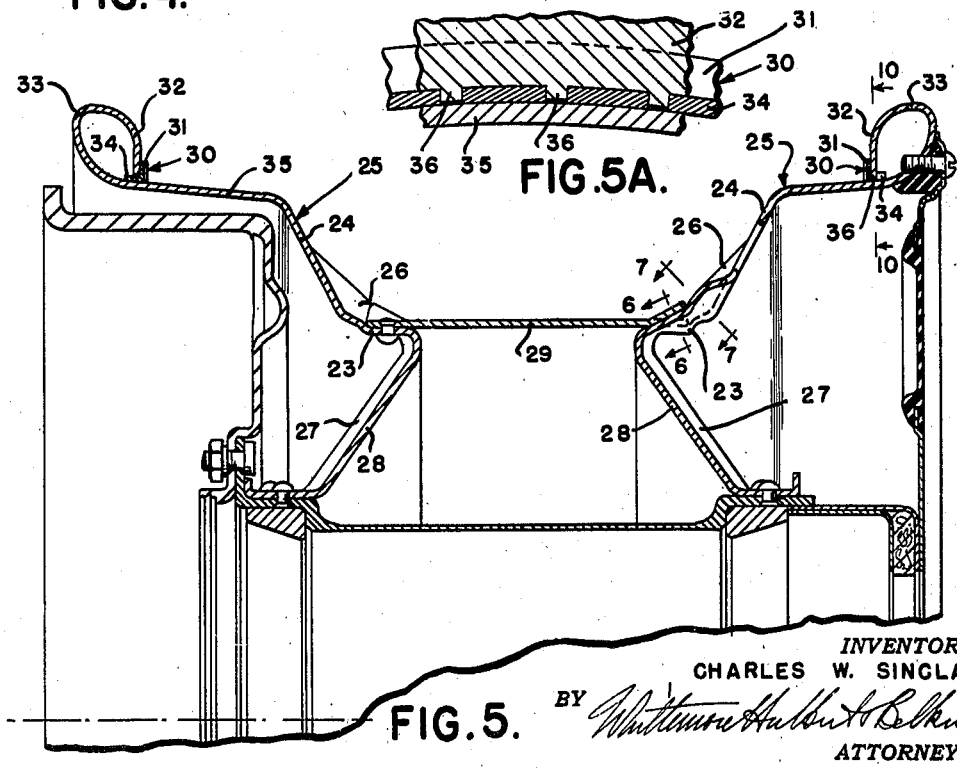
FIG. 5A.
FIG. 5.
INVENTOR.
CHARLES W. SINCLAIR
BY
ATTORNEYS Dec. 28, 1943.   C. W. SINCLAIR   2,337,779
WHEEL
Filed June 28, 1941   3 Sheets-Sheet 3

INVENTOR.
CHARLES W. SINCLAIR
BY
ATTORNEYS

Patented Dec. 28, 1943

2,337,779

UNITED STATES PATENT OFFICE 2,337,779

WHEEL

Charles W. Sinclair, Detroit, Mich., assignor to Kelsey-Hayes Wheel Company, Detroit, Mich., a corporation of Delaware Application June 28, 1941, Serial No. 400,307

2 Claims. (Cl. 301—63)

The invention relates to wheels and refers more particularly to wheels of that type adapted to receive tires of relatively large cross sections.

The invention has for one object to make a wheel of the type in question of steel and to so construct the wheel that it has substantially the strength and weight of a wheel made of aluminum or an aluminum alloy of the same type and size.

The invention has for other objects to provide an improved tire anti-creeping feature and to provide a novel method of forming the wheel embodying the tire anti-creeping feature.

With these as well as other objects in view, the invention resides in the novel features of construction and combinations and arrangements of parts as more fully hereinafter set forth.

In the drawings—

Figure 1 is an elevation of a portion of a wheel embodying my invention;

Figures 2 and 3 are cross sections on the lines 2—2 and 3—3, respectively, of Figure 1;

Figure 4 is a view similar to Figure 1 showing another embodiment of my invention;

Figure 5 is a cross section on the line 5—5 of Figure 4;

Figure 5A is a cross section on the line 5A—5A of Figure 5;

Figure 1:
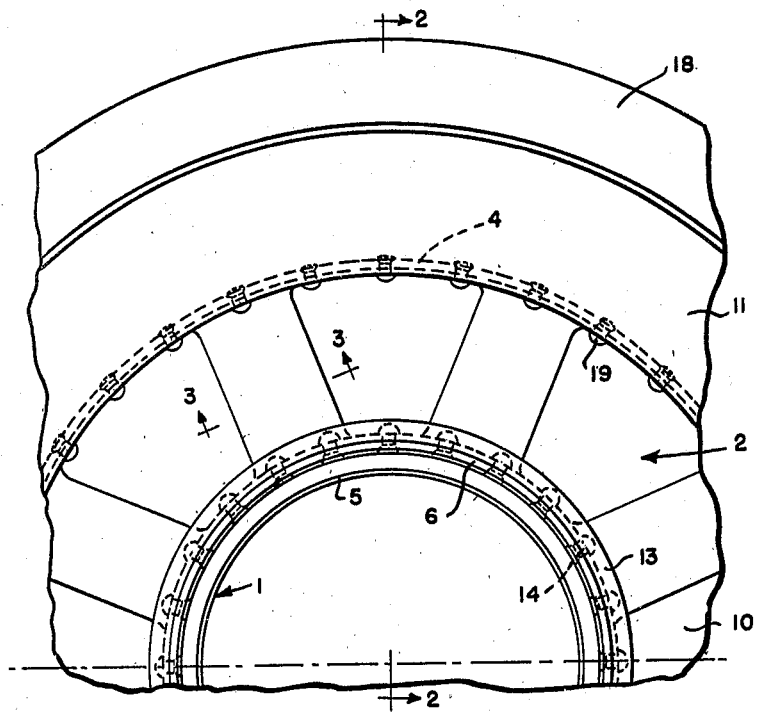
Figure 8:
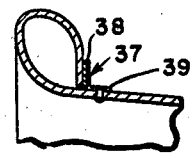
Figure 9:
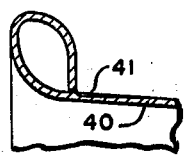
Figure 10:
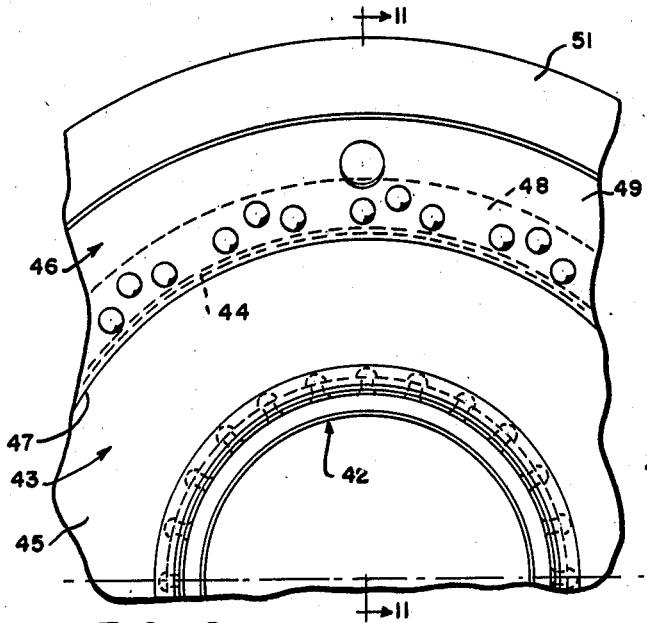
Figure 14:
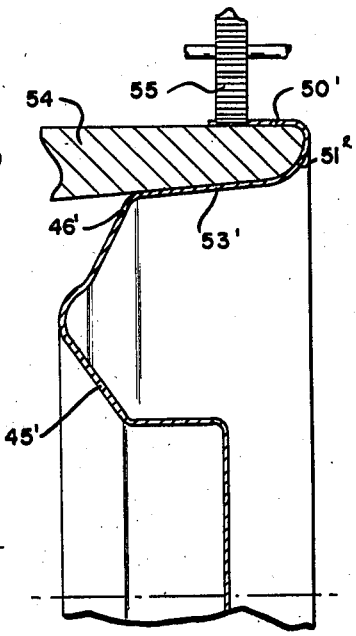
Figures 12, 13:
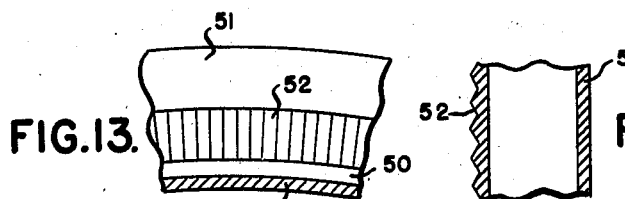
Figure 11:
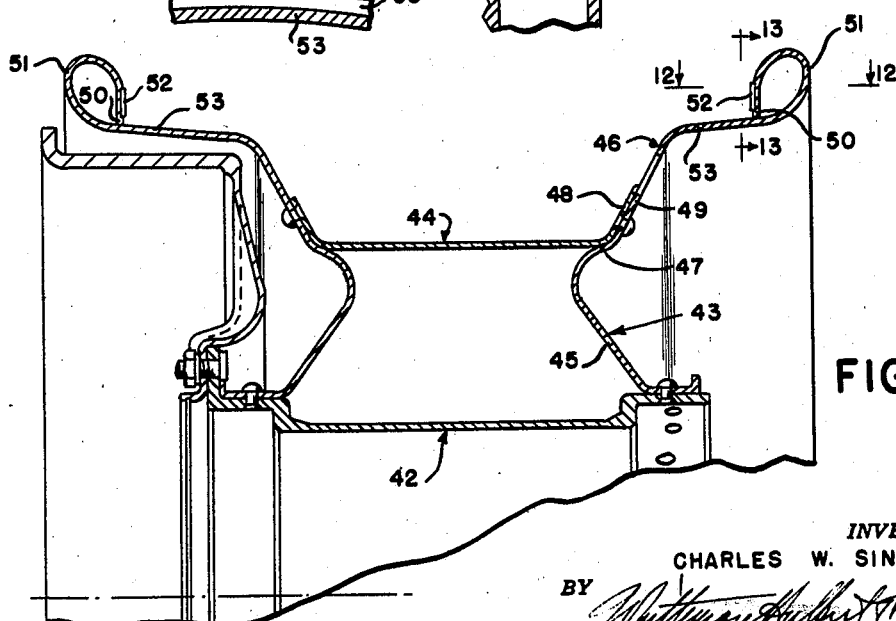

Figures 6 and 7 are cross sections on the lines 6—6 and 7—7, respectively, of Figure 5;

Figures 8 and 9 are views corresponding to a portion of Figure 5 illustrating different structures for preventing the tire from creeping on the rim;

Figure 10 is a view similar to Figure 1 showing another embodiment of my invention;

Figure 11 is a cross section on the line 11—11 of Figure 10;

Figures 12 and 13 are cross sections on the lines 12—12 and 13—13, respectively, of Figure 11;

Figure 14 is a view similar to a portion of Figure 11 illustrating a step in the method of manufacture.

Figure 3:
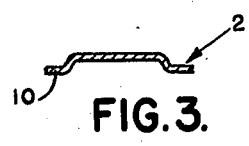
Figure 2:
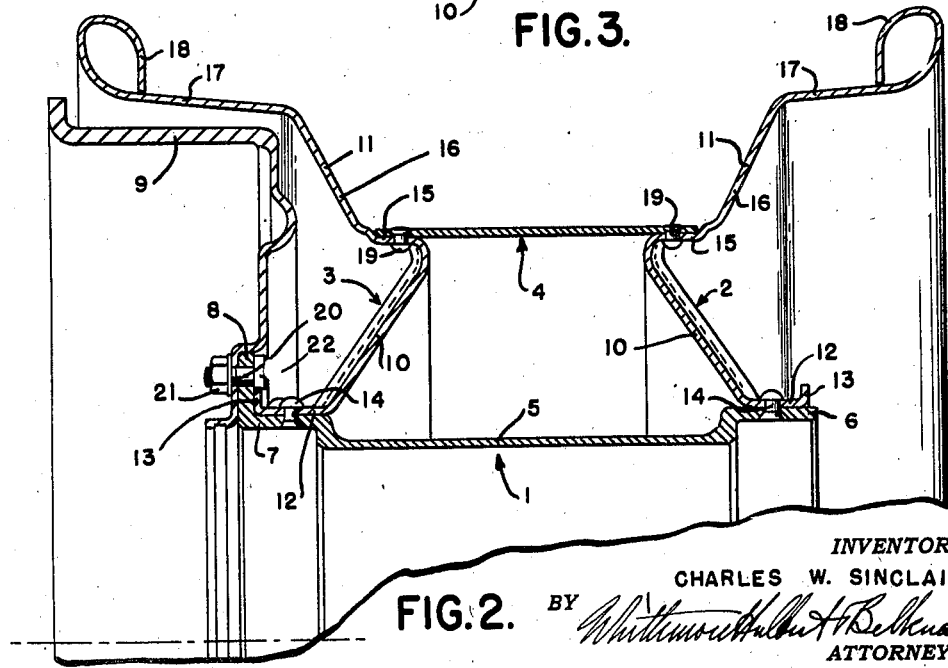

The wheel is designed particularly for use on airplanes and, as illustrated in Figures 1, 2 and 3, the wheel comprises the hub 1, the elements 2 and 3 mounted on and fixedly secured to the hub, and the annulus 4 mounted on and fixedly secured to the elements and forming with the radially outer portions thereof a tire carrying rim.

The hub 1 is formed of steel and preferably from a circular sheet steel blank by a series of drawing and upsetting and machining steps.

The hub 1 is tubular and has the reduced central portion 5 and the enlarged end portions 6 and 7 with the latter terminating in a radially outwardly extending annular flange 8 to which the brake drum 9 is secured.

Each of the elements 2 and 3 is made of sheet steel and has a generally radially extending body portion 10 and a rim portion 11 integral with the body portion. Each body portion has the central axial part 12 terminating in a radially outwardly extending annular flange 13. The axial part is fixedly secured to an enlarged end portion of the hub by suitable means, such as the rivets 14. The body portions are radially ribbed, as illustrated particularly in Figure 3, and converge radially outwardly from their central parts and are axially spaced from each other at their peripheral parts. The rim portions diverge radially outwardly from the peripheral parts of the body portions and each rim portion is formed with a generally axial base 15 extending outwardly from the associated peripheral part of the body portion, a radially and axially outwardly inclined side wall 16 extending from the base, a generally axially extending bead seat 17 extending from the side wall, and a tire retaining flange 18 extending from the bead seat. The bead seat is preferably inclined at an acute angle to the horizontal, the angle being preferably 5 degrees. The tire retaining flange is return-bent to form a closed hollow bead which is located axially outwardly beyond the central part of the body portion of the same element. Each of the combined rim and wheel body elements is preferably formed by die-pressing flat circular steel blanks.

The annulus 4 is made of sheet steel and is endless and adapted to telescope over and be fixedly secured to the bases 15 of the rim portions 11 by suitable means, such as the rivets 19. The annulus cooperates with the rim portions to form a drop-center tire carrying rim and the annulus cooperates with the side walls to form the wall of the rim. The bases 15 are depressed so that the faces of the annulus and side walls for contacting with the tube of the tire are substantially flush.

The brake drum 9 is secured to the flange 8 by means of the bolts 20 and the nuts 21. The shanks of the bolts extend through the web of the brake drum and the flange and the heads 22 of the bolts are flatted with their flats engaging the periphery of the flange 13 of the element 3 so that the bolts are held from rotation.

The wheel illustrated in Figures 4 to 7, inclusive, is constructed of steel elements formed in substantially the same manner as the wheel illustrated in Figures 1, 2 and 3. However, in the modified wheel the bases 23 and the side walls 24 of the rim portions 25 are formed with the radial ribs 26 which extend into and form a continuation of the radial ribs 27 formed in the body portions 28. These ribs serve to reinforce the bases and side walls and to increase their resistance to flexure. The sheet steel annulus 29 extends between and is fixedly secured to the bases of the rim portions to form the drop-center rim and the edges of the annulus are peripherally corrugated to conform to the ribbed bases.

To prevent creeping of the tire on the rim, there are the rings 30 of angular cross section each of which has a radial flange 31 formed with radial serrations and located at the inner side of the associated inturned terminal portion 32 of a bead 33. Each ring also has the axial flange 34 which extends between the edge of the terminal portion 32 and the extension of the bead seat 35. The flange is held from creeping on the rim by suitable means such as peripherally spaced projections 36 on the terminal portion engaging correspondingly spaced axial slots in the flange 34.

In the modification illustrated in Figure 8, each ring 37 is of angular cross section and has the radially serrated radial flange 38 at the inside of the associated bead and the axial flange 39 which extends along the bead seat and is riveted thereto to hold the ring from creeping.

Figure 9 discloses another modification in which each of the bead seats 40 is formed with the axially extending serrations 41. Each bead seat is preferably inclined at an acute angle to the axis of the rim, such angle being preferably 5 degrees, and the serrations are preferably parallel to the axis so that they gradually merge into the bead seat.

Figures 10 to 14, inclusive, illustrate another wheel comprising the hub 42, the combined rim and wheel body elements 43, and the annulus 44. The hub is of the same construction and also formed in the same manner as the hub 1. Each of the combined rim and wheel body elements is preferably formed by die-pressing flat circular sheet metal blanks, preferably formed of steel, and comprises the body portion 45 and the integral rim portion 46. The body portion has its central axial part fixedly secured to an enlarged end portion of the hub and the associated rim portion has its generally axial base 47 curved to substantially form a continuation of the curve at the peripheral part of the body portion, the curve being more gradual or having a greater radius than in the other modifications. The annulus 44 is made of sheet steel and endless. The annulus also has upwardly diverging flanges 48 fitting and fixedly secured to the side walls 49 of the rim portions as by means of rivets. The annulus further has curved junctions between its side flanges and base which fit and rest on the bases 47. The inturned terminal portion 50 of the bead 51 of each rim portion is formed with the radial serrations 52 to prevent creeping of the tire when mounted on the rim. The serrations preferably terminate a short distance from the edge of the terminal portion and the associated generally axially extending bead seat 53 of the rim portion.

In the manufacture of the wheel, the combined rim and wheel body elements and the annulus are formed separately. Each wheel body element is progressively formed from a flat circular steel blank by a series of die-pressing steps into the blank illustrated in Figure 14 having the body forming portion 45' and the rim forming portion 46'. The rim forming portion has the part $51^2$ which extends generally radially outwardly from the bead seat forming part 53' and the terminal forming part 50' which extends substantially axially from the part $51^2$ over the part 53'. While the part 50' is held in its substantially axial position by the back up die 54, the serrations are formed by rolling the knurl tool 55 over the part 50'. After the serrations have been formed, the terminal forming part is progressively bent radially inwardly by a series of die-pressing steps to its final position, completing the forming of the closed hollow bead. Then the steps of removing the central portion of the blank and completing the formation of the central part of the body portion by die-pressing, and finally the forming of rivet holes as by drilling, are carried out, after which the completed rim and wheel body element is ready for assembly. The annulus is preferably formed from a flat steel blank by hooping the same, welding its ends, and sizing, the diverging side flanges being preferably fashioned by die-pressing.

What I claim as my invention is:

1. A wheel comprising a hub, combined rim and wheel body elements, each having a wheel body portion and a rim portion with the body portion mounted on said hub and the rim portion formed with a base, a side wall extending from said base, a bead seat extending from said side wall and a tire retaining flange extending from said bead seat, and an annulus extending between and fixedly secured to said rim portions, said annulus telescoping and being mounted on the bases of said rim portions and cooperating with the side walls of said rim portions to form the well of a drop-center rim.

2. A wheel comprising a hub, sheet metal combined rim and wheel body elements, each having a body portion and a rim portion with the body portion mounted on said hub and the rim portion formed with a base, a side wall extending from said base, a bead seat part extending from said side wall and a tire retaining flange part extending from said bead seat part, means on one of said parts for engaging a tire casing to hold the same from creeping, and an annulus extending between and fixedly secured to said rim portions, said annulus telescoping and being mounted on the bases of said rim portions and cooperating with the side walls of said rim portions to form the well of a drop-center rim.

CHARLES W. SINCLAIR.